United States Patent Office 3,458,560
Patented July 29, 1969

3,458,560
PROCESS FOR PREPARING 2,6-
DICHLOROBENZONITRILE
Rudolph A. Carboni, Wilmington, Del., assignor to E. I. du Pont de Nemours and Company, Wilmington, Del., a corporation of Delaware
No Drawing. Continuation-in-part of application Ser. No. 482,254, Aug. 24, 1965. This application Mar. 24, 1966, Ser. No. 537,022
Int. Cl. C07c *121/52*
U.S. Cl. 260—465                                    10 Claims

ABSTRACT OF THE DISCLOSURE

Process for preparing 2,6-dichlorobenzonitrile which comprises reacting 2,6-dichlorobenzal chloride with hydroxylamine or a salt thereof at from about 50° C. to about 200° C. in the presence of formic acid. Preferably the benzal chlroide is heated in the formic acid prior to addition of the hydroxylamine. A Lewis acid metal halide can be employed to accelerate the formation of the benzal chloride/formic acid reaction mass; while an acid acceptor compound can be added along with the hydroxylamine to accept hydrogen and free hydroxylamine for reaction.

This application is a continuation-in-part of my parent copending application Ser. No. 482,254, filed Aug. 24, 1965, now abandoned.

This invention is directed to a process for preparing 2,6-dichlorobenzonitrile.

The product 2,6-dichlorobenzonitrile is a well-known plant growth regulator. The compound itself is known, having been described in Beilstein's Handbook, vol. 10, First Supplement, p. 141. Recently, increased economic importance in producing 2,6-dichlorobenzonitrile on a commercial basis has been generated by the discovery that this nitrile is also a useful herbicide. Accordingly, a commercial process which would produce 2,6-dichlorobenzonitrile in high yields would satisfy an urgent need in the expanding commercialization of this product.

It is, therefore, an object of this invention to provide a novel process for the manufacture of 2,6-dichlorobenzonitrile which gives very high yields of the desired product in a single, convenient, rapid reaction.

It is a further object of this invention to provide a process for the production of 2,6-dichlorobenzonitrile which utilizes readily available starting materials in conventional process equipment.

These and other objects will become apparent from the following description and claims.

More specifically, the present invention is directed to a process for the manufacture of 2,6-dichlorobenzonitrile which comprises:

(A) contacting in a formic acid reaction medium 2,6-dichlorobenzal chloride with hydroxylamine or a salt thereof at from about 50° C. to about 200° C., and
(B) recovering 2,6-dichlorobenzonitrile from the reaction medium.

Broadly, the present process comprises heating to a temperature of from about 50° C. to about 200° C. 2,6-dichlorobenzal chloride

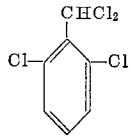

with hydroxylamine or a salt thereof. The reaction is unique in that it must be carried out in a formic acid reaction medium. Surprisingly, the desired reaction takes place to a significantly lesser extent in other organic acid media such as acetic acid and propionic acid. In addition, the product obtained with the latter acids is of poorer quality. Stoichiometrically, one mole of 2,6-dichlorobenzonitrile is formed for each mole of the benzal chloride or hydroxylamine, whichever is present in the lesser amount. A reaction temperature of at least 50° C. is required to produce useful rates of reaction. At temperatures above about 200° C., undesirable side reactions become too rapid, making the operation of this process at such temperatures unattractive commercially.

Since hydroxylamine is the source of nitrogen in the product nitrile, one mole is required for each mole of nitrile formed. In order to accelerate the reaction rate and completely convert the benzal chloride reactant, it is preferred to use an excess of hydroxylamine. The excess over the stoichiometrical amount is not required, however, since as long as both the benzal chloride and hydroxylamine are present, the desired nitrile will form to the extent that the more limited reactant is available.

Hydroxylamine itself is not very stable. It is usually sold and transported as a strong acid salt, for example, as hydroxylamine hydrochloride or hydroxylamine sulfate. Although hydroxylamine itself may be used as a reactant in the present invention, the strong acid salts of hydroxylamine are preferred in the present process because of their more ready availability and greater stability.

Formic acid is used as the reaction medium, usually in considerable excess. Sufficient formic acid is required to keep the reaction mass fluid; otherwise, the amount of formic acid used is not critical. It has been unexpectedly discovered that formic acid is unique in the present process, since the instant reaction proceeds to a considerably lesser extent when other organic acids such as acetic acid and propionic acid are used as reaction media.

Although it is desirable to avoid gross amounts of water in the present process, it is not necessary to use anhydrous reactants. Commercial grades of the reactants containing up to about 20% water are suitable.

The product 2,6-dichlorobenzonitrile is recovered from the reaction mixture by conventional, well-known techniques. One convenient method of isolation is to dilute the reaction mass with sufficient water to dissolve the water-soluble materials present and to collect the insoluble 2,6-dichlorobenzonitrile by such means as filtration, or in a centrifuge or by other like methods for separating solids from liquids. Alternatively, 2,6-dichlorobenzonitrile may be collected directly from the cooled reaction mixture by filtration. The solids are then washed with water to remove water-soluble materials. In a third method, the formic acid is removed by distillation, the residue drowned in water and the 2,6-dcihlorobenzonitrile collected by filtration and dried. The product recovered from the novel process of this invention is of high purity and does not normally require further purification. However, should such be desired, this may be accomplished by recrystallization from solvents such as aqueous isopropanol.

The reaction time required varies broadly with specified reaction conditions. Reaction temperatures as high as 200° C. may be used. Since formic acid has an atmospheric pressure boiling point of 100° C., it is generally preferable to operate in this range and below to avoid the pressure equipment which is required if higher temperatures are used.

While the above-described process will produce 2,6-dichlorobenzonitrile in good yield, a further refinement in the process has been found which produces even higher yields. It has been found that higher yields are obtainable if the reagents are added in a step-wise procedure rather than being contacted together in one step at the beginning of the process. Thus, as a preferred embodiment of this invention, the reaction of the present process is carried out in two steps. In the first step, the reactants 2,6-dichlorobenzal chloride and formic acid are combined and heated, preferably at 80° C. to 140° C., until a soluble mass is obtained. The point at which a soluble mass is obtained is best determined by cooling a portion of the reaction mass to ambient temperatures and observing whether the sample remains cloudy. If the cloudiness has disappeared, a soluble mass has been achieved. In the second step of the process, at least one mole of the hydroxylamine or hydroxylamine salt is added to the heated soluble mass. The heating of the reaction mass to a temperature of from 80° C. to 140° C. is continued after the addition of hydroxylamine. At the conclusion of the reaction, 2,6-dichlorobenzonitrile is recovered as previously described.

The present process is accelerated by the addition of certain compounds. Two types of accelerators are known, soluble Lewis acid metal halides and acid acceptors. The meanings of these terms as used herein are more fully explained below. The two types of accelerators have individual effects, independent of each other. When the present process is carried out in two steps as described earlier, it is found that the soluble Lewis acid metal halides are active accelerators in the first step of forming the soluble reaction mass.

Lewis acid metal halides are well known, being metal halides which have acid properties as defined by G. N. Lewis. According to Lewis, an acid is a compound capable of accepting electrons from donor molecules, e.g., see Remick, "Electronic Interpretations of Organic Chemistry," Wiley, 2nd Ed., p. 237 et seq., of Wheland, "Advanced Organic Chemistry," Wiley, 2nd Ed., p. 80 et seq. Not all Lewis acid metal halides are useful accelerators in the present process, however, since only those which have at least 2% by weight solubility in the reaction medium and are non-reactive with the formic acid reaction medium show activity. Thus, while zinc chloride, ferric chloride, stannous chloride, and similar Lewis acid metal halides which are soluble in formic acid are useful, aluminum chloride and similar Lewis acid metal halides which are not at least 2% by weight soluble in the reaction medium or react with formic acid show little or no activity. The term "soluble Lewis acid metal halides" includes, therefore, only those compounds which have at least 2% by weight solubility in the formic acid reaction medium.

Usually only a catalytic amount of Lewis acid metal halide is required to accelerate the formation of a soluble reaction mass. Generally as little as 0.1 mole per mole of 2,6-dichlorobenzal chloride is quite effective. From 0.1 to 0.2 mole per mole is usually preferred.

The action of the soluble Lewis acid metal halide accelerator in the present process is significant. Heating times required to obtain a reaction mass which does not become cloudy on cooling may be decreased by a factor of twenty by the presence of the accelerator.

It is, therefore, a preferred embodiment of the present process to add a soluble Lewis acid metal halide to the reaction mixture, particularly to the first step of the aforementioned preferred two-step addition procedure of the present process.

The second type of accelerators are known as the acceptor accelerators. These substances react with strong acids, for example, mineral acids, to effectively remove hydrogen ion from the medium in preference to reacting with weaker acids and particularly formic acid. It is well known that hydroxylamine is a weak base similar to ammonia which enters the equilibrium below in the presence of acids $$NH_2OH + H^+ \rightleftarrows N^+H_2OH \cdot H$$

The acid acceptors, therefore, by removing free hydrogen ion from the reaction system, are believed to effect the release of more free hydroxylamine which accelerates the second step of the process involving the reaction of hydroxylamine with benzal chloride.

Two types of acid acceptors are known to be useful: (1) alkali or alkaline earth salts of organic carboxylic acids and particularly the aliphatic carboxylic acids, and (2) certain tertiary amines. Both types should be free of functional groups which react with hydroxylamine or the benzal chloride, for instance, mercapto, carbonyl, or like reactive substituents.

While any organic carboxylic acid salt will function to some extent, the salts derive from the fatty acids, i.e., aliphatic acids of up to 12 carbon atoms, are most useful. The sodium or potassium salts of such fatty acids and particularly formic, acetic, propionic, and butyric acids are preferred. Sodium formate and sodium acetate are the preferred species.

Included among the useful tertiary amines are the simple aliphatic tertiary amines $R_3N$ where each R is alkyl or hydroxy alkyl of from 1 to 4 carbon atoms, the heterocyclic tertiary aliphatic amines

where Q is a divalent aliphatic group forming a ring with N, and R is alkyl or hydroxy alkyl, or the heterocyclic tertiary aromatic amines where the tertiary nitrogen is part of an aromatic ring system containing no more than two aromatic rings.

Examples of useful tertiary aliphatic amines are triethylamine, trimethylamine, tributylamine, tripropylamine, ethyldimethylamine, methyldiethylamine, methyldipropylamine, ethyldipropylamine, methyldibutylamine, triethanolamine, methyldiethanolamine, and dimethylethanolamine.

Examples of useful heterocyclic aliphatic tertiary amines are N-methylpiperidine, N-methylmorpholine, N-methylpyrrolidine, N,N'-dimethylpiperazine, N,N'-dimethylpiperimidine, or the like.

Examples of heterocyclic tertiary aromatic amines are pyridine, pyridazine, pyrimidine, pyrazine, picoline, collidine, lutidine, quinoline, quinaldine, lepidine, isoquinoline, and like compounds.

The preferred tertiary amines are triethylamine and pyridine.

An equivalent amount of acid acceptor per mole of 2,6-dichlorobenzal chloride is added to the reaction mixture. An excess above the equivalent amount of acid acceptor may be added and is preferred.

Although strong bases such as alkali metal hydroxides or carbonates will react with hydrogen ion, they will also react with the formic acid reaction medium to form formate salts. Thus, if desired, alkali formate acid acceptors may be formed in situ by the addition of alkali hydroxide or carbonate to the medium. Carbonate would be preferable since it adds no further water to the system.

It is, therefore, a preferred embodiment of the present process to add an acid acceptor to the reaction system, particularly in the second-step addition of the preferred two-step process described earlier.

The most preferred embodiment of the present process consists of heating at 80° C. to 140° C., preferably about 100° C., a mixture containing in relative proportions one mole of 2,6-dichlorobenzal chloride, from 0.1 to 0.2 mole of a Lewis acid metal halide, preferably ferric chloride, stannous chloride, or zinc chloride, and up to about 15 moles of formic acid for up to two hours. Then about 1.5 moles of hydroxylamine hydrochloride or hydroxylamine sulfate and 2 to 4.5 moles of an acid acceptor, preferably triethylamine, sodium acetate, pyridine, or sodium formate, are added and heating is continued for an additional one to 2.5 hours. The reaction mass is then cooled, diluted with an excess of water and filtered to collect the product 2,6-dichlorobenzonitrile. Alternatively, the reaction mass may be chilled as, for example, with brine, the product collected by centrifuge or similar methods and then washed with water to remove water-soluble materials.

The starting materials for the present process, 2,6-dichlorobenzal chloride, hydroxylamine and the salts thereof, and the accelerators, if used, are all readily available commercial intermediates which are prepared by a number of routes.

Representative examples illustrating the present invention follow. All parts are by weight unless specified otherwise.

The starting material 2,6-dichlorobenzal chloride used in the following examples was found to be 93.2% pure by vapor phase chromatography. Accordingly, the percent yields given in the following examples are based on the amount of 2,6-dichlorobenzal chloride actually used.

Example 1

A mixture of 2.30 g. (0.0100 mole) 2,6-dichlorobenzal chloride, 0.20 g. (0.00147 mole) zinc chloride and 18.3 g. (0.398 mole) formic acid were stirred at reflux for one hour. The mixture was cooled to 25° C. and 0.80 g. (0.0115 mole) hydroxylamine hydrochloride and 3.0 g. (0.0441 mole) sodium formate were added. The mixture was heated at reflux for one hour, cooled to 25° C. and diluted with 250 ml. water. The mixture was filtered and the solid was washed with water and air dried, giving 1.59 g. (99.3%) of 2,6-dichlorobenzonitrile, M.P. 142.0–143.5° C.

When hydroxylamine is substituted in the above procedure for hydroxylamine hydrochloride, substantially the same results are obtained.

Example 2

The procedure of Example 1 was repeated except that both steps were carried out at 140° C. (a Paar pressure bomb was used) and each heating period was cut to ten minutes. This gave 68.7% of crude product, M.P. 120–132° C., which was recrystallized from aqueous isopropanol to give 36.2% of 2,6-dichlorobenzonitrile, M.P. 141–143° C. When this reaction product was mixed with pure 2,6-dichlorobenzonitrile, the mixed M.P. was 141–144° C.

Example 3

The procedure of Example 1 was repeated except that zinc chloride was omitted and the first heating period was lengthened to 16.5 hours. This gave a 94.8% yield of crude product which was recrystallized from aqueous isopropanol to give 71.6% 2,6-dichlorobenzonitrile, M.P. 143–144° C., mixed M.P. 142.5–143.5° C.

Example 4

The procedure of Example 1 was repeated except that both steps were carried out at 50° C. and the heating periods were 24.0 and 22.8 hours, respectively. Dilution of the reaction mixture gave an oil which was extracted with two 70 ml. portions of chloroform. The chloroform was removed in vacuo. The infrared spectrum of the residue (run in chloroform solution) had a band at 4.45 microns characteristic of the C≡N group. From this analysis, the presence of the 2,6-dichlorobenzonitrile was indicated.

Example 5

A mixture of 2.30 g. 2,6-dichlorobenzal chloride, 0.80 g. hydroxylamine hydrochloride, 2.70 g. sodium formate, 0.20 g. zinc chloride and 18.3 g. formic acid was stirred at reflux 18.2 hours. The mixture was cooled, diluted with 250 ml. water and filtered to give 1.31 g. (81.9%) material melting at 80° C. to 115° C. The infrared spectrum of a chloroform solution had a band at 4.44 microns, indicating that 2,6-dichlorobenzonitrile was present. One recrystallization from aqueous isopropanol and two from isopropanol gave 0.20 g. (12.5%) white needles, M.P. 137–143° C.

Example 6

A mixture of 12.5 g. 2,6-dichlorobenzal chloride (0.0506 mole), 2.0 g. (0.0147 mole) zinc chloride and 30 mls. (0.69 mole) of 88% formic acid was heated under reflux with agitation for two hours. The mixture was cooled to 90° C., 4.0 g. (0.0576 mole) hydroxylamine hydrochloride added, and heating under reflux continued for 2.5 hours. After the mass was cooled, product 2,6-dichlorobenzonitrile crystallized from solution and was collected by filtration. The filter cake was slurried with 200 ml. water, recollected and air dried, giving 7.8 g. (89.6% yield) of 2,6-dichlorobenzonitrile, M.P. 141–143° C.

Example 7

Example 6 was repeated in detail except that 10.0 g. (0.099 mole) of triethylamine were added with the 4.0 g. (0.0576 mole) of hydroxylamine hydrochloride. After heating for 2.5 hours as before, 8.0 g. (91.9%) of 2,6-dichlorobenzonitrile was obtained, M.P. 141–145° C.

Example 8

Example 6 was repeated in detail except that 8.4 g. (0.102 mole) of anhydrous sodium acetate were added with the 4.0 g. (0.0576 mole) of hydroxylamine hydrochloride. After heating as before, 8.6 g. (98.8%) of 2,6-dichlorobenzonitrile were obtained, M.P. 141–144° C.

Example 9

A mixture of 124.0 g. (0.502 mole) 2,6-dichlorobenzal chloride and 300 ml. (6.9 moles) of 88% formic acid was heated under reflux with agitation for 17 hours. After the solution was cooled to room temperature, 40.0 g. (0.576 mole) of hydroxylamine hydrochloride was added, and heating under reflux was continued for 2.5 hours. The reaction mass was cooled, the product precipitated, and the supernatent formic acid was decanted. The remaining mass was treated with ether. The ether-insoluble solids were collected by filtration, washed with water and air dried, giving 35.2 g. of 2,6-dichlorobenzonitrile, M.P. 139.5–142.5° C. A further 20 g. of product were found in the ether extracts. Ttotal yield of 55.2 g. was obtained which represents a 63% conversion. Sufficient 2,6-dichlorobenzal chloride was identified to account for a major proportion of the 37% of unconverted 2,6-dichlorobenzal chloride.

Example 10

A mixture of 37.5 g. (0.163 mole) of 2,6-dichlorobenzal chloride, 12 g. (0.230 mole) of 2.38 hydroxylamine hydrochloride, and 90 ml. (2.38 mole) of 98% formic acid was heated at 106° C. for ten hours. On cooling, a mixture of crystals and oil separated. The supernatent formic acid was decanted, the crystals collected (2.3 g.) and the mixture of crystals and oil dissolved in chloroform. A vapor phase chromatography analysis of the chloroform solution indicated that 12.9 g. of 2,6-dichlorobenzonitrile were present. The total yield of 2,6-dichlorobenzonitrile was 15.2 g. (58.1%).

Example 11

A mixture of 37.5 g. (0.163 mole) of 2,6-dichlorobenzal chloride, 90 ml. (2.38 mole) of 88% formic acid, and 7.1 g. (0.0438 mole) of anhydrous ferric chloride was heated under reflux with agitation for one hour. The mixture was cooled to 80° C., 12 g. (0.230 mole) of hydroxylamine hydrochloride were added, and heating under reflux was continued for 2.5 hours. After standing overnight at room temperature, the supernatent liquid was separated from the crystalline mass by decantation. The crystalline mass was stirred with 150 ml. water, collected by filtration and air dried, giving 22.3 g. of product. An additional 3.6 g. of product were obtained from the aqueous filtrate; total yield of 2,6-dichlorobenzonitrile was 25.9 g. (92.4%). The product was at least 94.5% pure.

Example 12

Example 11 was repeated in detail, using 8.3 g. (0.0437 mole) of anhydrous stannous chloride in place of the ferric chloride and 98% formic acid rather than the 88%. A total of 22.7 g. (81.0%) of 2,6-dichlorobenzonitrile was obtained of 96% purity.

Example 13

(A) A mixture of 37.5 g. (0.152 mole) of 2,6-dichlorobenzal chloride, 8.3 g. (0.044 mole) anhydrous stannous chloride and 90.0 ml. (2.39 moles) of 98–100% formic acid was heated under reflux with agitation for 1.5 hours, then cooled to 90° C. and 12.0 g. (0.173 mole) hydroxylamine hydrochloride and 7.0 g. (0.103 mole) sodium formate were added. Heating under reflux was continued for 2 hours. The reaction mixture was cooled to room temperature and poured into 600 ml. distilled water. The product was collected by filtration, washed with water and air dried overnight, yielding 25.5 g. (97.5%) of 2,6-dichlorobenzonitrile, M.P. 138–142° C.

(B) A mixture of 37.5 g. 2,6-dichlorobenzal chloride, 8.3 g. anhydrous stannous chloride and 90.0 ml. of 98–100% formic acid was heated under reflux for 1.5 hours, cooled to 90° C. and 12.0 g. hydroxylamine hydrochloride and 8.0 g. (0.101 mole) pyridine added. Heating under reflux was continued for 2.0 hours. The reaction mixture was cooled to room temperature and poured into 600 ml. distilled water. The product was collected by filtration, washed with water and air dried overnight, giving 27.3 g. (about 100%) of 2,6-dichlorobenzonitrile, M.P. 139–142° C.

(C) A mixture of 37.5 g. 2,6-dichlorobenzal chloride, 8.3 g. anhydrous stannous chloride and 90.0 ml. of 98–100% formic acid was heated under reflux for 1.5 hours, cooled to 90° C. and 12.0 g. hydroxylamine hydrochloride and 16.0 g. (0.262 mole) of monoethanolamine were added. Heating under reflux was continued for two hours. The reaction mixture was cooled to room temperature and poured into 600 ml. distilled water. The product was collected by filtration, washed with water and air dried overnight, giving 30.2 g. (about 100%) of 2,6-dichlorobenzonitrile, M.P. 140–142° C.

Example 14

A mixture of 2.30 g. (0.01 mole) of 2,6-dichlorobenzal chloride, 15.0 ml. (0.398 mole) of 98–100% formic acid and 0.30 g. (0.00185 mole) anhydrous ferric chloride was heated under reflux with agitation for one hour. Then 0.80 g. (0.0123 mole) of hydroxylamine hydrochloride and 2.80 g. (0.0412 mole) of sodium formate were added and heating under reflux was continued for one hour. The reaction mixture was cooled to room temperature and poured into 150 ml. water, the product was collected by filtration, washed with water and air dried, giving 1.54 g. (89.6%) of 2,6-dichlorobenzonitrile, M.P. 137–141° C.

Example 15

A mixture of 37.5 g. (0.163 mole) 2,6-dichlorobenzal chloride, 90 ml. (2.38 mole) 88% formic acid and 5.7 g. (0.0428 mole) of anhydrous aluminum chloride was heated under reflux for 2.75 hours. The aluminum chloride did not dissolve. The oily layer did not dissolve. Then 12 g. (0.230 mole) of hydroxylamine hydrochloride was added an heating under reflux continued for 2.5 hours. The product was treated as in Example 9, giving somewhat poorer results due to the 2.75 hours vs. 17 hours initial reflux period.

Example 16

A mixture of 124.0 g. (0.502 mole) 2,6-dichlorobenzal chloride, 20.0 g. (0.147 mole) zinc chloride, 300 ml. (5.24 moles) glacial acetic acid and 10 ml. (0.506 mole) water was heated under reflux with agitation for two hours. The resulting mixture was cooled to 70° C. and divided into two equal portions.

To the first portion was added 20.0 g. (0.288 mole) of hydroxylamine hydrochloride and 42.0 g. (0.512 mole) anhydrous sodium acetate. This mixture was heated further under reflux for 2.5 hours. Then 100 ml. acetic acid was distilled from the mixture, 300 ml. water was added, the precipitated solids collected by filtration, washed with water and air dried, giving 25.8 g. of 2,6-dichlorobenzonitrile of 84.4% purity, yield 47.7%, M.P. 92.0–117.0° C.

To a second portion were added 20.0 g. (0.288 mole) hydroxylamine hydrochloride and 35.0 g. (0.515 mole) sodium formate. After heating under reflux for 2.5 hours, the product was isolated as described for the first portion, giving 25.8 g. of 2,6-dichlorobenzonitrile, M.P. 125–134° C., of 84.3% purity. The yield was 50%.

It is readily apparent on comparing this example with Examples 9 and 10 that the process using acetic acid as the reaction medium even with accelerators is much poorer in conversions than the process using formic acid without accelerators. When compared to Examples 1 and 8, it is most surprising that such a striking difference exists when formic acid rather than acetic acid is used as the reaction medium.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. A process for preparing 2,6-dichlorobenzonitrile consisting essentially of:
    (A) contacting at a temperature from 50° C. to about 200° C. 2,6-dichlorobenzal chloride with hydroxylamine, hydroxylamine hydrochloride or hydroxylamine sulfate in a formic acid reaction medium, in which the molar ratio of the hydroxylamine or said salt to the 2,6-dichlorobenzal chloride is at least 1 to 1 and in which the formic acid is present in at least an amount sufficient to keep the reaction mass fluid, and
    (B) recovering 2,6-dichlorobenzonitrile from the reaction medium.

2. The process of claim 1 wherein a catalytic amount of a Lewis acid metal halide having a solubility of at least 2% by weight in the reaction mixture is added to the reaction.

3. The process of claim 1 wherein at least an equivalent amount of an acid acceptor, per mole of 2,6-dichlorobenzal chloride, is added to the reaction mixture, said acid acceptor being selected from (a) the alkali or alkaline earth salts of aliphatic carboxylic acids or (b) a tertiary amine, and being free of functional groups reactive with the reactants.

4. A process for preparing 2,6-dichlorobenzonitrile consisting essentially of:
    (A) heating at about 80° C. to 140° C., 2,6-dichlorobenzal chloride in a formic acid reaction medium in which the formic acid is present in at least an amount sufficient to keep the reaction mass fluid until a soluble reaction mass is formed,
    (B) adding at least one mole of hydroxylamine, hydroxylamine hydrochloride or hydroxylamine sulfate per mole of 2,6-dichlorobenzal chloride,
    (C) heating the mixture to a temperature from about 80° C. to 140° C., and
    (D) recovering 2,6-dichlorobenzonitrile from the reaction mixture.

5. A process for preparing 2,6-dichlorobenzonitrile according to claim 4 wherein the soluble reaction mass of (A) is formed in the presence of a catalytic amount of a Lewis acid metal halide having a solubility of at least 2% by weight in the reaction mixture.

6. A process for preparing 2,6-dichlorobenzonitrile according to claim 4 wherein at least one equivalent of an acid acceptor, per mole of 2,6-dichlorobenzal chloride, is added to the soluble reaction mass with hydroxylamine, hydroxylamine hydrochloride or hydroxylamine sulfate of step (B), said acid acceptor being selected from (a) the alkali metal or alkaline earth metal salts of aliphatic carboxylic acids or (b) a tertiary amine, and being free of functional groups reactive with the reactants.

7. A process for preparing 2,6-dichlorobenzonitrile according to claim 4 wherein the soluble reaction mass of (A) is formed in the presence of a catalytic amount of a Lewis acid metal halide having a solubility of at least 2% by weight in the reaction mixture and wherein at least one equivalent of acid acceptor, per mole of 2,6-dichlorobenzal chloride, is added to the soluble reaction mass with the hydroxylamine, hydroxylamine hydrochloride or hydroxylamine sulfate of step (B), said acid acceptor being selected from (a) the alkali metal or alkaline earth metal salts of aliphatic carboxylic acids or (b) a tertiary amine, and being free of functional groups reactive with the reactants.

8. A process for preparing 2,6-dichlorobenzonitrile consisting essentially of:
(A) heating at 80° C. to 140° C. for about one hour a mixture containing 2,6-dichlorobenzal chloride, from 0.1 to 0.2 mole of a Lewis acid metal halide, per mole of dichlorobenzal chloride, and an amount of formic acid ranging from an amount sufficient to keep the reaction mass fluid up to 15 moles of formic acid per mole of dichlorobenzal chloride, said Lewis acid metal halide being at least 2% by weight soluble in the formic acid reaction medium,
(B) thereafter adding about 1.5 moles of hydroxylamine hydrochloride or hydroxylamine sulfate and from about 2.0 to about 4.5 moles of an acid acceptor per mole of dichlorobenzal chloride, said acid acceptor being selected from (a) the alkali metal or alkaline earth metal salts of aliphatic carboxylic acids or (b) a tertiary amine, and being free of functional groups reactive with the reactants,
(C) heating the mixture to a temperature from about 80° C. to 140° C. for an additional hour, and
(D) recovering 2,6-dichlorobenzonitrile from the reaction mixture.

9. A process for preparing 2,6-dichlorobenzonitrile consisting essentially of:
(A) heating at 100° C. for about one hour a mixture containing 2,6-dichlorobenzal chloride, from 0.1 to 0.2 mole of zinc chloride, per mole of dichlorobenzal chloride, and an amount of formic acid ranging from an amount sufficient to keep the reaction mass fluid up to about 15 moles of formic acid per mole of dichlorobenzal chloride,
(B) thereafter adding about 1.5 moles of hydroxylamine hydrochloride or hydroxylamine sulfate and from about 4.0 to about 4.5 moles of sodium formate per mole of dichlorobenzal chloride,
(C) heating the mixture to a temperature of from about 80° C. to about 140° C. for an additional hour, and
(D) recovering 2,6-dichlorobenzonitrile from the reaction mixture.

10. The process of claim 1 wherein:
(1) a catalytic amount of a Lewis acid metal halide having a solubility of at least 2% by weight in the reaction mixture and
(2) at least an equivalent amount of an acid acceptor per mole of dichlorobenzal chloride, said acid acceptor being selected from (a) the alkali metal or alkaline earth metal salts of aliphatic carboxylic acids or (b) a tertiary amine, and being free of functional groups reactive with the reactants,
are added to the reaction mixture.

References Cited

UNITED STATES PATENTS

| | | | |
|---|---|---|---|
| 2,650,933 | 9/1953 | Pearl | 260—465 X |
| 3,129,260 | 4/1964 | Yates et al. | 260—465 X |
| 3,225,081 | 12/1965 | Koopman | 260—465 |

JOSEPH P. BRUST, Primary Examiner

S. T. LAWRENCE III, Assistant Examiner

U.S. Cl. X.R.

71—105